Figure 3:
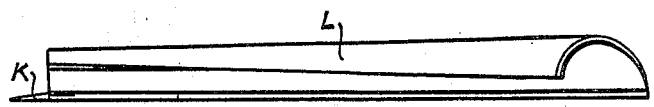

J. L. JARDINE.
APPARATUS FOR PREPARING BAMBOO AND KINDRED MATERIAL FOR PULP EXTRACTION.
APPLICATION FILED AUG. 15, 1921.
1,398,861.
Patented Nov. 29, 1921.
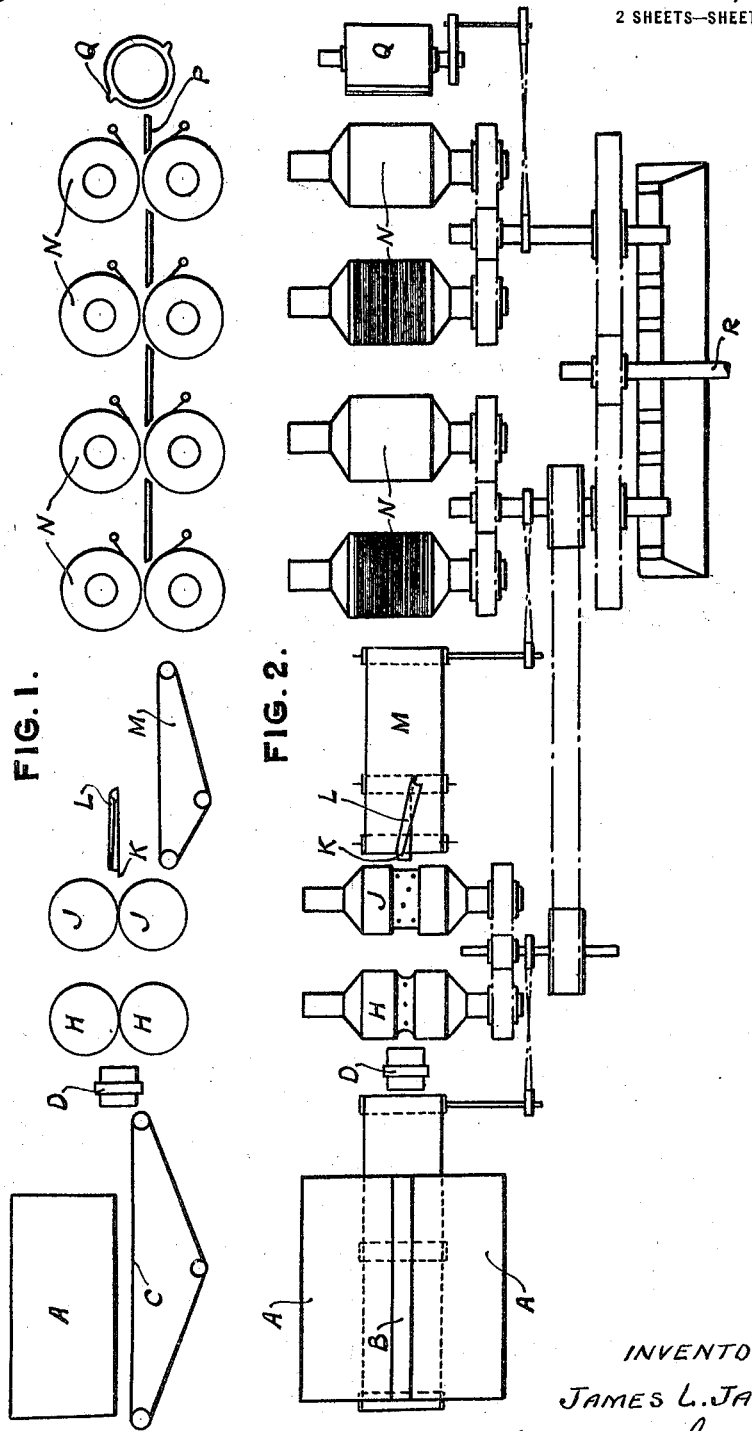
INVENTOR
JAMES L. JARDINE
BY
ATTORNEYS J. L. JARDINE.
APPARATUS FOR PREPARING BAMBOO AND KINDRED MATERIAL FOR PULP EXTRACTION.
APPLICATION FILED AUG. 15, 1921.

1,398,861. Patented Nov. 29, 1921.
2 SHEETS—SHEET 2.

INVENTOR
JAMES L. JARDINE
BY Howson and Howson
ATTORNEYS

UNITED STATES PATENT OFFICE.

JAMES LOCKHART JARDINE, OF PENICUIK, SCOTLAND, ASSIGNOR TO BAMBOO PAPER COMPANY, LIMITED, OF LONDON, ENGLAND.

APPARATUS FOR PREPARING BAMBOO AND KINDRED MATERIAL FOR PULP EXTRACTION.

1,398,861.   Specification of Letters Patent.   Patented Nov. 29, 1921.

Application filed August 15, 1921. Serial No. 492,579.

*To all whom it may concern:*

Be it known that I, JAMES LOCKHART JARDINE, a subject of the King of Great Britain and Ireland, and a resident of Penicuik, Scotland, engineer, have invented certain new and useful Apparatus for Preparing Bamboo and Kindred Material for Pulp Extraction, (for which I have been granted British Patent No. 14,421, June 16, 1914, French Patent No. 489,701, April 12, 1918, Hong Kong Patent No. 12, June 16, 1914, Straits Settlement Registration dated June 16, 1914, and China Registration No. 20,-834, June 28, 1920,) of which the following is the specification.

The invention relates to apparatus for the preparing of bamboo for treatment in a digester for pulp extraction, and of the type in which the bamboo is first flattened or crushed and then broken and finally cut into suitable lengths, and the invention has for its object to provide an improved construction of such apparatus.

The improved apparatus comprises essentially means for feeding the stems of bamboo or the like endwise through preferably a brushing device wherein adherent dirt and other readily detachable substances are removed from the exterior of the stems to one or more pairs of cracking rollers to set either horizontally or more or less vertically that the stems are cracked longitudinally and flattened. From the cracking rolls the cracked and flattened stems pass to a plow device comprising a blade part adapted to separate the stems, and a share part or parts adapted to lay the separated parts side by side on a conveyer which delivers them to the first of a series of pairs of crushing and disintegrating rolls. Each pair of these rolls consists of one plain and one circumferentially and comparatively finely grooved or corrugated. There are several pairs, and in each succeeding pair the grooved or corrugated roll is placed to attack the opposite side of the stems from that which the preceding roll attacked. The grooving of these rolls is devised to stretch the surface and separate the fibers and not to penetrate or cut through the material. From the last pair of these rolls the now thoroughly crushed and disintegrated stems are delivered over a fixed knife with which coacts a rotary blade driven at such speed relatively to the surface speed of the rolls that the stem tissue is divided into portions of convenient length.

Figure 4:
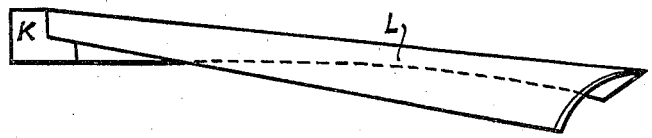
Figure 5:
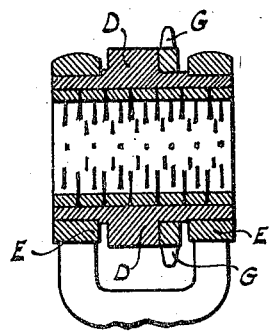

There is shown diagrammatically upon two accompanying sheets of explanatory drawings an example of a machine made according to the invention, Figures 1 and 2, Sheet 1, being respectively a side elevation and a plan thereof, while Figs. 3 and 4, Sheet 2, are respectively an elevation and a plan of the plow device, and Fig. 5 a section of the brushing device, Figs. 3 to 5 being to an enlarged scale.

According to this example the means for feeding the stems consist of a rectangular casing A of a length to accommodate the run of stems, its bottom being inclined from opposite sides to the middle where there is a longitudinal slot B. Through the slot the stems fall successively upon a band conveyer C, withdrawing the lowermost stems and projecting them to and through a brushing device D consisting of a cylinder armed internally with bristles projecting radially inward. As shown in Fig. 5 this cylinder is carried in bearings in a bracket E and has on it a sprocket wheel G so that it may be rotated by a sprocket chain (not shown) from any convenient source of power. In passing through the cylinder D adherent dirt is removed from the exterior of the stems. From the cylinder the stems pass between two pairs of grooved cracking rolls H, J. The grooves in the first pair H of these rolls are of a width to permit of the entrance of the stems between, but their bottoms are flattened and their depth is such that the stems are slightly flattened and longitudinally cracked, this action on the stems being increased when they pass through the grooves in the second pair of rolls J, as these latter grooves are shallower and broader than those in the first pair of rolls. In order to feed the stems through these rolls H, J, studs or spikes are provided in the grooved parts.

From the cracking rolls H, J, the cracked and flattened stems pass to and are attacked by a plow or dividing device consisting of a knife part K and a plow or share part L. The knife K is set parallel with the axes of the cracking rolls and midway of the gap between their grooves, so that it splits the issuing cracked stems into two portions— each stem being by it longitudinally divided in half, the lower portion falling directly on to a second conveyer M of ordinary belt form. The plow or share part L is of inverted channel form, and lies at such an angle across the conveyer M that the upper portion of the split stem is so guided that it is turned over and falls on to the conveyer to one side of the lower portion. Thus the split portions are laid side by side with their inner surfaces uppermost upon the conveyer. The conveyer M delivers the split stems to the first of a series of pairs of crushing and disintegrating rolls N. Four pairs of these rolls are shown in the drawings, but a larger number may be required, depending upon the material being treated. Each pair consists of one plain and one circumferentially and comparatively finely grooved or corrugated; and, as shown, in each succeeding pair, the position of the rolls is reversed so that the grooved roll in each succeeding pair attacks the opposite side of the stems from that which the preceding grooved roll attacked. The crushing rolls are provided with usual means (not shown) for applying adequate pressure to them. From the last pair of these rolls the now thoroughly crushed and disintegrated stems are delivered over a fixed knife P with which coacts rotatory blades Q driven at such speed relative to the surface speed of the rolls N that the stem tissue is divided into portions of convenient length. The various rolls, the conveyer belt, and the cutting blades are all driven from a first-motion shaft R by gearing of known form as shown diagrammatically in Fig. 2.

It will be evident that the axes of the cracking rolls H, J, may be vertical or inclined instead of horizontal as shown, and in that case the knife K will also be set vertically, and a share part may be arranged on each side thereof to insure that both portions will be delivered with the same side upward upon the conveyer M.

What I claim is:—

1. Apparatus for preparing bamboo and kindred material for pulp extraction comprising in combination means for feeding the stems through one or more pairs of cracking rolls, a plow device which splits the cracked stems into two portions, a series of pairs of crushing and disintegrating rolls through which the split stems pass, means for dividing the stems into portions of convenient length after they leave the last pair of crushing rolls, and means for driving the various parts of the apparatus as described.

2. In combination with the apparatus forming the subject-matter of claim 1 hereof, a brushing device comprising a rotating cylinder or cylinders armed internally with inwardly projecting radial bristles, as described.

3. In the apparatus forming the subject-matter of claim 1 hereof; pairs of rolls having grooves of a width to permit of the entrance of the stems between them, the bottoms of these grooves being close enough set to crack and longitudinally flatten the stems, as described.

4. In the apparatus forming the subject-matter of claim 1 hereof; a plow device comprising firstly a knife part set parallel with the axes of the cracking rolls and midway of the gap between their grooves and secondly an inclined share part or parts of inverted channel form, as described.

5. In the apparatus forming the subject-matter of claim 1 hereof; pairs of crushing and disintegrating rolls, each pair consisting of one plain and one grooved or corrugated roll, the position of the rolls being reversed in each succeeding pair, as described.

In testimony whereof I have signed my name to this specification.

JAMES LOCKHART JARDINE.

Witness:
J. W. WRIGHT.